United States Patent [19]

Kaji et al.

[11] Patent Number: 5,223,602
[45] Date of Patent: Jun. 29, 1993

[54] NAPHTHOL ARALKYL RESINS AND CURED PRODUCTS THEREOF

[75] Inventors: Masashi Kaji, Kitakyushu; Takanori Aramaki, Fukuoka; Norito Nakahara; Yasuharu Yamada, both of Kitakyushu, all of Japan

[73] Assignee: Nippon Steel Chemical Co., Ltd., Tokyo, Japan

[21] Appl. No.: 823,957

[22] Filed: Jan. 24, 1992

[51] Int. Cl.$^5$ .................... C08G 65/38; C08G 65/14
[52] U.S. Cl. .................... 528/212; 528/97; 528/214; 528/218; 525/507; 525/534; 549/546; 549/560; 568/717; 568/716; 568/736
[58] Field of Search .................... 528/212, 214, 97, 129, 528/218; 525/534, 507; 568/719, 736, 717; 549/560, 546

[56] References Cited

U.S. PATENT DOCUMENTS

| | | | |
|---|---|---|---|
| 4,551,508 | 5/1985 | Uraski | 528/97 |
| 4,908,424 | 3/1990 | Dewhirst et al. | 528/97 |
| 5,068,293 | 11/1991 | Kaji et al. | 528/97 |
| 5,155,202 | 10/1992 | Morita et al. | 528/97 |

FOREIGN PATENT DOCUMENTS

| | | |
|---|---|---|
| 0415790A2 | 3/1991 | European Pat. Off. |
| 63-238122 | 10/1988 | Japan. |
| 3-090075 | 4/1991 | Japan. |
| 1-224520 | 4/1991 | Japan .................... 528/97 |

*Primary Examiner*—John Kight, III
*Assistant Examiner*—Richard Lee Jones
*Attorney, Agent, or Firm*—Armstrong, Westerman, Hattori, McLeland & Naughton

[57] ABSTRACT

This invention relates to naphthol aralkyl resins of the general formula (I)

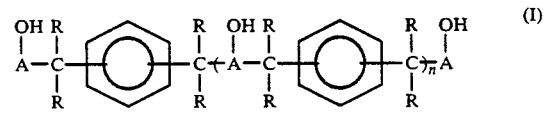

in which A is a naphthalene nucleus, R is hydrogen or methyl, and n is an integer from 0 to 15 and cured products thereof, which are highly heat- and moisture-resistant, possess excellent impact strength and other mechanical properties, and are useful for such applications as lamination, molding, casting, and adhesion.

2 Claims, 6 Drawing Sheets

NAPHTHOL ARALKYL RESINS AND CURED PRODUCTS THEREOF

FIELD OF THE INVENTION AND RELATED ART STATEMENT

This invention relates to naphthol aralkyl resins curable into water- and moisture-resistant products of excellent mechanical strength and to cured products thereof.

In recent years, progress in the area of advanced materials has created a need for base resins of higher performance. For example, higher heat and moisture resistance than currently available is in strong demand for epoxy resin matrixes in composite materials intended for the aircraft and space industries and for resins for protection of semiconductors.

None of the epoxy resins known to date, however, meets such requirements. For instance, the well-known bisphenol A-based epoxy resins are used widely as their being liquid at ambient temperature makes them easy to work with and facilitates their mixing with curing agents and additives. They offer no solutions, however, to the problems of heat and moisture resistance. On the other hand, phenol novolak epoxy resins are known for their improved heat resistance, but they are not satisfactory in respect to moisture and impact resistance. Epoxy resins based on phenol aralkyl resins have been proposed in Japan Tokkyo Kokai Koho No. 63-238,122 (1988) with the objective of improving the impact resistance, but they are not satisfactory as far as the heat and moisture resistance is concerned.

OBJECT AND SUMMARY OF THE INVENTION

It is therefore an object of this invention to provide naphthol aralkyl resins which are highly resistant to heat and moisture, possess excellent mechanical properties such as impact resistance, and are useful for a variety of applications such as lamination, molding, casting, and adhesion.

Another object of this invention is to provide cured products which are obtained by curing naphthol aralkyl resins, have excellent water-resistance and moisture-resistance and also have excellent mechanical properties such as impact resistance.

Accordingly, this invention relates to naphthol aralkyl resins of the following general formula (I)

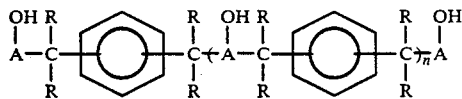

in which A is a naphthalene nucleus, R is hydrogen or methyl, and n is an integer from 0 to 15.

This invention also relates to cured products of naphthol aralkyl resins as mentioned above.

The naphthol aralkyl resins of the aforesaid general formula (I) can be prepared by the reaction of 1-naphthol or 2-naphthol or a mixture thereof with a condensing agent of the following formula (II) consisting of a dialcohol or its ether

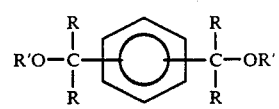

in which R is hydrogen or methyl and R' is hydrogen or hydrocarbon radical with 1 to 4 carbon atoms. The condensing agent may be an o-, m-, or p-isomer, preferably m- or p-isomer. Examples of such condensing agents are p-xylylene glycol, α,α'-dimethoxy-p-xylene, α,α'-diethoxy-p-xylene, α,α'-di-n-propoxy-p-xylene, α,α'-diisopropoxy-p-xylene, 1,4-di(2-hydroxy-2-propyl)benzene, 1,4-di(2-methoxy-2-propyl)benzene, 1,4-di(2-ethoxy-2-propyl)benzene, 1,4-di(2-n-propoxy-2-propyl)benzene, and 1,4-di(2-isopropoxy-2-propyl)benzene.

The mole ratio of naphthol to the condensing agent is 1 mole of the former to 1 mole or less, preferably 0.1 to 0.9 mole, of the latter.

With less than 0.1 mole of the condensing agent, more naphthol remains unchanged which makes it difficult to purify the resins. On the other hand, the use of more than 0.9 mole enhances the softening point of the resins and makes the resins difficult to work with in some of their applications. It is desirable to keep the integer n at 15 or less in the general formula (II).

The reaction of naphthol with the condensing agent to yield the naphthol aralkyl resins is carried out in the presence of an acid catalyst. This catalyst may be suitably chosen from the known inorganic and organic acids. Examples are mineral acids such as hydrochloric acid, hydrofluoric acid, phosphoric acid, and sulfuric acid, organic acids such as formic acid, oxalic acid, trifluoroacetic acid, and p-toluenesulfonic acid, and Lewis acids and solid acids such as zinc chloride and aluminum chloride.

The reaction in question is normally carried out at 10° to 250° C. for 1 to 20 hours. It is allowable to use a solvent in the reaction. Examples of the solvents are alcohols such as methanol, ethanol, propanol, butanol, ethylene glycol, diethylene glycol, Methyl Cellosolve, and Ethyl Cellosolve and aromatic hydrocarbons such as benzene, toluene, chlorobenzene, and dichlorobenzene.

The naphthol aralkyl resins of this invention thus obtained are useful as intermediates for epoxy resins and also as cured products obtained by curing them together with curing agents such as hexamethylenetetramine, polyisocyanate, epoxy compound and the like. When the naphthol aralkyl resins are allowed to cure with epoxy resins, they can turn into cured products with improved mechanical properties, in particular excellent tenacity and moisture resistance compared with a conventional cured product. The naphthol aralkyl resins of this invention are especially suitable for the use of resins for protection of semiconductors which can be obtained by mixing curing accelerators for epoxy resins and inorganic fillers therewith and have excellent crack resistance.

The cured products of the naphthol aralkyl resins of this invention can be prepared by heating and curing the naphthol aralkyl resins together with curing agents such as hexamethylenetetramine, polyisocyanate, epoxy compound and the like.

The naphthol-based epoxy resins are also obtained by the reaction of epichlorohydrin with the naphthol aralkyl resins of the aforesaid general formula (I). This reaction can be carried out like the usual epoxidation reaction.

For instance, the naphthol aralkyl resins of the aforesaid general formula (I) are dissolved in an excess of epichlorohydrin and the solution is allowed to react in the presence of an alkali metal hydroxide such as potassium hydroxide at 50° to 150° C., preferably 60° to 120° C., for 1 to 10 hours. The amount of epichlorohydrin here ranges from 2 to 15 times, preferably from 2 to 10 times, the number of mole of the naphthol nucleus while that of the alkali metal hydroxide ranges from 0.8 to 1.2 times, preferably 0.9 to 1.1 times, the number of mole of the naphthol nucleus.

Upon completion of the reaction, the excess epichlorohydrin is distilled off, the remainder is dissolved in a solvent such as methyl isobutyl ketone, the solution is filtered, and the filtrate is washed with water to remove the inorganic salts and then stripped of the solvent by distillation to yield the desired epoxy resins.

The epoxy resins thus prepared are mixed with curing agents and curing accelerators and cured by heating to give products of good properties. The curing agents include polyhydric phenols such as phenol novolaks, cresol novolaks, and poly(hydroxyphenyl)ethane, aromatic amines such as phenylenediamine, diaminodiphenylmethane, diaminodiphenyl sulfone, and diaminodiphenyl ether, and acid anhydrides such as phthalic anhydride, hexahydrophthalic anhydride, nadic methyl anhydride, pyromellitic anhydride, and benzophenonetetracarboxylic acid anhydride. The curing accelerators include triphenylphosphine, imidazole, and 1,8-diazabicyclo[5,4,0]undecene-1.

This epoxy resins can be cured by the addition of the aforesaid curing agents and curing accelerators or, as needed, by further addition of fillers such as powders of fused silica, powders of crystalline silica, talc, alumina, calcium carbonate, and glass fibers. The resins may be reinforced with high-modulus fibers such as carbon fibers and aramid fibers.

The naphthol aralkyl resins of this invention are useful for the preparation of cured products having excellent resistance to heat, moisture, and impact, and especially useful for the preparation of epoxy resin compositions which are expected to find their way into a variety of applications such as resins for the aerospace industry, protection of semiconductors and the like.

DETAILED DESCRIPTION OF THE PREFERRED EMBODIMENTS

This invention will be explained in detail with reference to the accompanying examples and comparative examples.

EXAMPLE 1

In a 500-ml. three-necked flask was placed a solution of 144 g. (1.0 mole) of 1-naphthol and 69 g. (0.5 mole) of p-xylylene glycol in 120 ml. of 1-butanol, 25 ml. of water and 9.5 g. of concentrated hydrochloric acid were added, and the mixture was allowed to react with stirring at 95° to 98° C. for 3 hours. The reaction mixture was neutralized with a dilute aqueous sodium hydroxide solution, washed with water, distilled to drive off the 1-butanol, and then steam-distilled to remove the unchanged 1-naphthol and give 132 g. of a naphthol aralkyl resin which was an intermediate for epoxy resins. The resin thus obtained showed a hydroxyl equivalent of 222 and a softening point of 105° C. as determined according to JIS K 2548.

Figure 1:
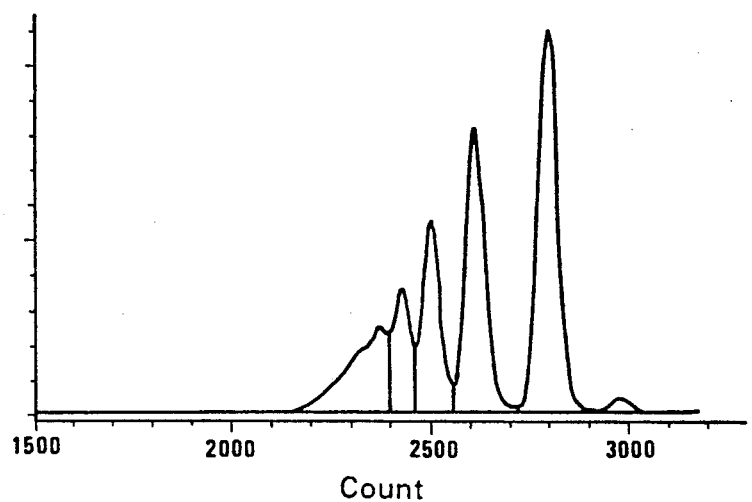
FIGS. 1 and 2 are respectively the gel permeation chromatogram and infrared absorption spectrum of the resin obtained in Example 1.
Figure 2:
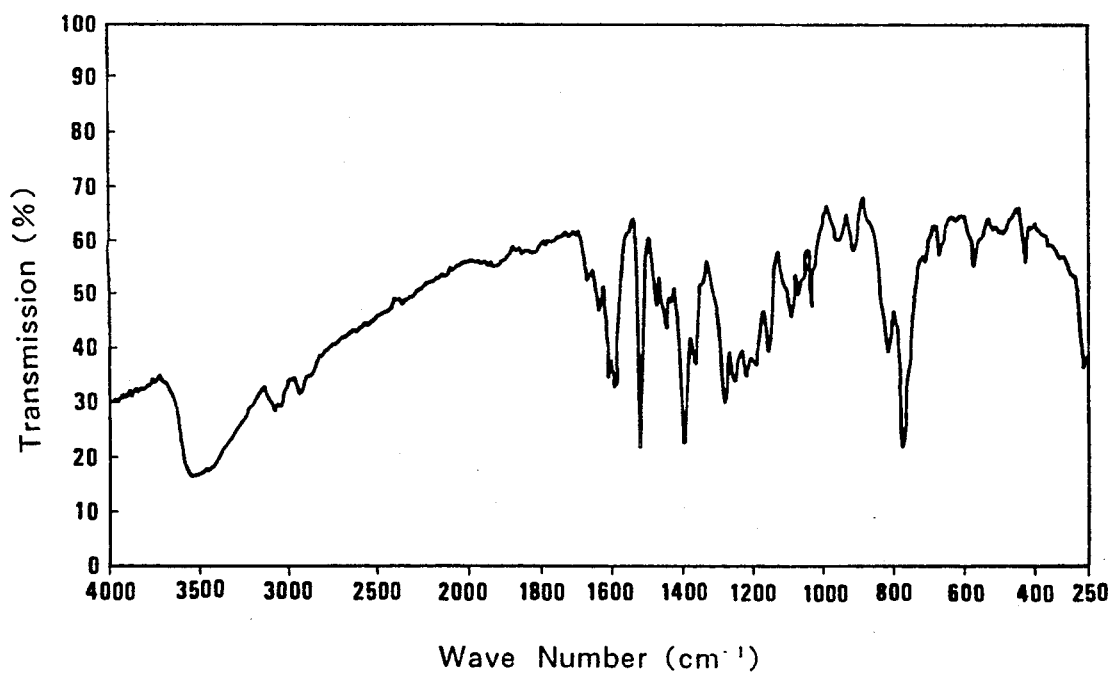

Measurements by gel permeation chromatography and infrared absorption spectroscopy were made on the resin and the results are shown in FIGS. 1 and 2.

EXAMPLE 2

Figure 3:
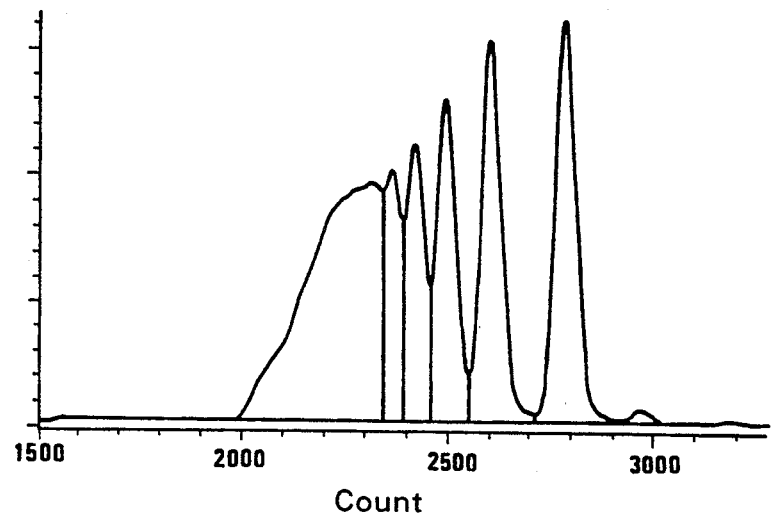
FIG. 3 is the gel permeation chromatogram of the resin obtained in Example 2.

The reaction was carried out as in Example 1 with the use of 96 g. (0.67 mole) of 1-naphthol and 69 g. (0.5 mole) of p-xylylene glycol to give 116 g. of a naphthol aralkyl resin with a hydroxyl equivalent of 234 and a softening point of 130° C. The gel permeation chromatogram of the resin is shown respectively in FIG. 3.

EXAMPLE 3

Figure 4:
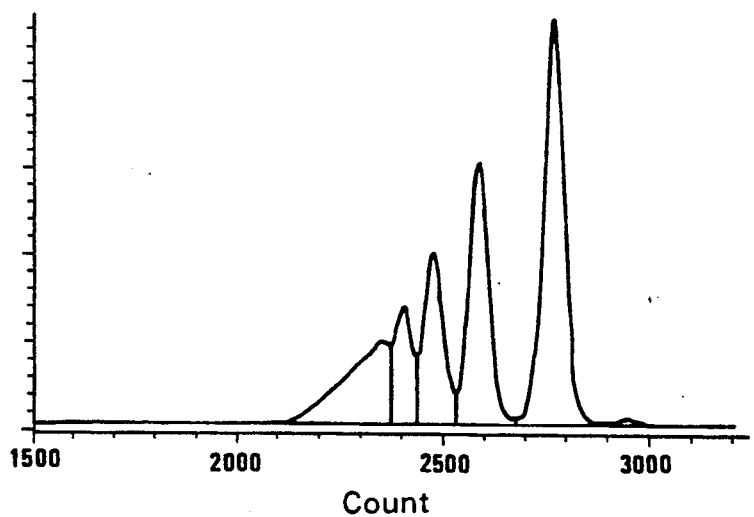
FIGS. 4 and 5 are respectively the gel permeation chromatogram and infrared absorption spectrum of the resin obtained in Example 3.
Figure 5:
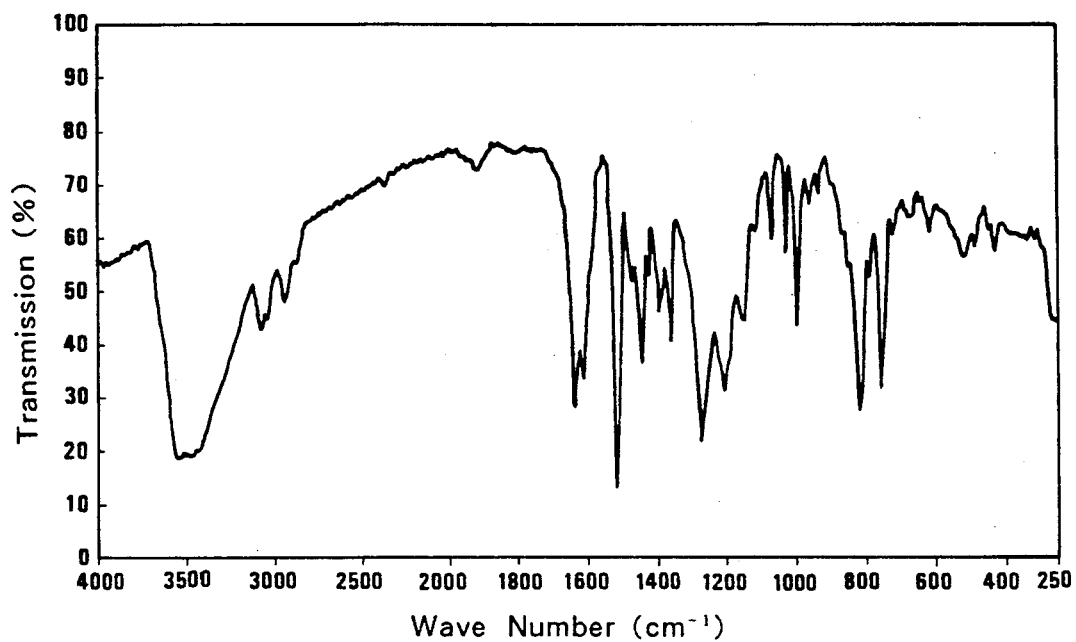

With the exception of using 2-naphthol, the reaction was carried out exactly as in Example 1 to give 127.5 g. of a naphthol aralkyl resin with a hydroxyl equivalent of 225 and a softening point of 114° C. The gel permeation chromatogram and infrared absorption spectrum of the resin are shown respectively in FIGS. 4 and 5.

EXAMPLE 4

A mixture of 144 g. (1.0 mole) of 2-naphthol and 46 g. (0.33 mole) of p-xylylene glycol was heated at 130° C. to form a solution, 0.7 g. of p-toluenesulfonic acid was added, and the resulting mixture was allowed to react at 130° C. for 2 hours. The reaction mixture was then neutralized with a sodium carbonate solution and steam-distilled to remove the unchanged 2-naphthol and give 69 g. of a naphthol aralkyl resin with a hydroxyl equivalent of 212 and a softening point of 103° C.

EXAMPLE 5

A mixture of 108 g. (0.75 mole) of 2-naphthol, 69 g. (0.5 mole) of p-xylylene glycol, and 5.4 g. of oxalic acid was allowed to react at 150° C. for 6 hours with the removal of water of reaction from the system.

The mixture was then steam-distilled to remove the unchanged 2-naphthol and give 119 g. of a naphthol aralkyl resin with a hydroxyl equivalent of 223.5 and a softening point of 136° C.

EXAMPLE 6

In a 3-l. flask were placed 430.3 g. (3.4 moles) of 1-naphthol, 329.8 g. (1.7 moles) of 1,4-di(2-hydroxy-2-propyl)benzene, and 1,600 ml. of toluene, 4.95 g. of p-toluenesulfonic acid was further added, and the mixture was allowed to react under reflux for 5 hours. Thereafter, about 1 l. of toluene was distilled off, the remainder was cooled to room temperature, and the crystals formed were collected by filtration and recrystallized from toluene to give 560 g. of white crystals with a melting point of 238° C.

The crystals thus obtained were identified as those of the desired 1,4-di[2-(1-hydroxy-2-naphthyl)-2-propyl]-benzene on the basis of the H-NMR spectroscopic data shown in Table 1.

TABLE 1

| H-NMR Spectral peaks (solvent; CDCl$_3$) | |
|---|---|
| 1.75 (12H, s) | 4.87 (2H, s) |
| 7.59 (4H, s) | 7.40-7.45 (4H, m) |
| 7.48 (2H, d; J = 8.55 Hz) | 7.63 (2H, d; J = 8.78 Hz) |
| 7.77 (2H, d; J = 7.32 Hz) | 8.10 (2H, d; J = 7.33 Hz) |

SUPPLEMENTARY EXAMPLE 1

Figure 6:
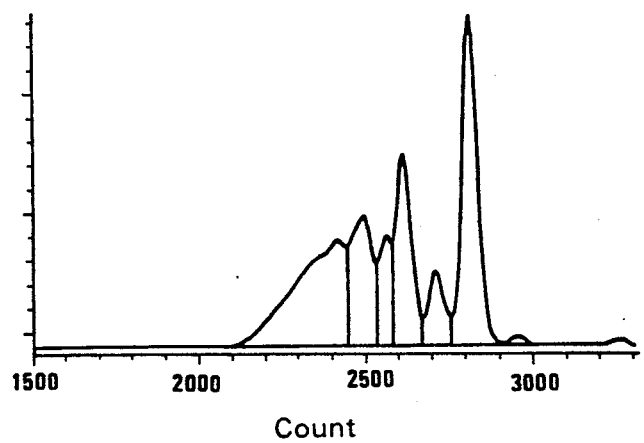
FIGS. 6 and 7 are respectively the gel permeation chromatogram and infrared absorption spectrum of the resin obtained in Example 7.
Figure 7:
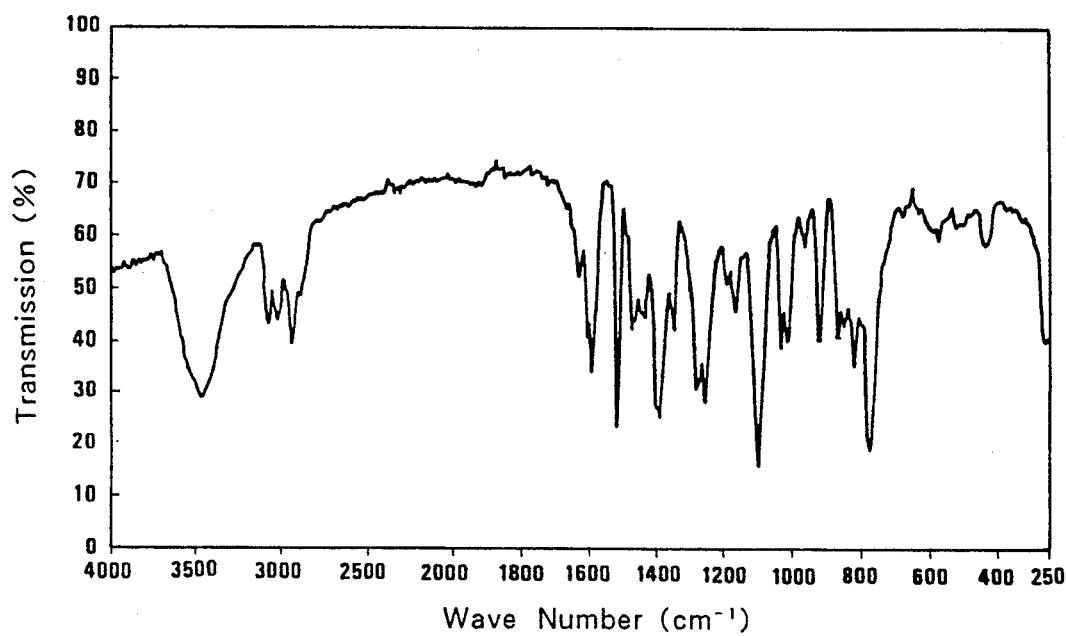

In 600 g. of epichlorohydrin was dissolved 100 g. of the naphthol aralkyl resin obtained in Example 1, 37.5 g. of a 48% aqueous sodium hydroxide solution was added in drops in 3.5 hours at 113° to 117° C. In the meantime, water of reaction was removed from the system by azeotropic distillation with epichlorohydrin and the distilled epichlorohydrin was returned to the system. Upon completion of the addition, the reaction was allowed to proceed for additional 15 minutes, the epichlorohydrin was distilled off, the residue was extracted with methyl isobutyl ketone, the extract was washed with water, and the methyl isobutyl ketone was distilled off to recover 122 g. of an epoxy resin. The resin showed an epoxy equivalent of 316, a softening point of 90° C., and a melt viscosity of 6.0 P at 150° C. The gel permeation chromatogram and infrared absorption spectrum of the resin in question are shown respectively in FIGS. 6 and 7.

An epoxy resin composition was prepared by mixing 100 parts of the epoxy resin thus obtained with a phenol novolak (curing agent) and triphenylphosphine (curing accelerator) at ratios shown in Table 2 and molded at 150° C. and specimens from the cured product were tested for a variety of properties. The results are shown in Table 2.

The glass transition temperature and the linear expansion coefficient were measured with the aid of a thermomechanical analyzer at a test speed of 7° C./min. The flexural strength and the flexural modulus were determined in accordance with JIS K 6911. The moisture absorption was determined after allowing the specimen to absorb moisture at 133° C. and 3 atmospheres for 100 hours. The fracture toughness was determined in accordance with a method described by A. F. Yee and R. A. Pearson in Journal of Materials Science, 21, 2462 (1986).

SUPPLEMENTARY EXAMPLE 2

Figure 8:
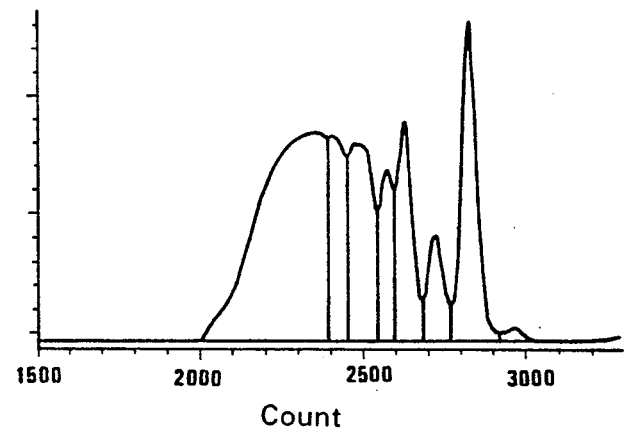
FIG. 8 is the gas permeation chromatogram of the epoxy resin obtained in Example 8.

In 600 g. of epichlorohydrin was dissolved 100 g. of the naphthol aralkyl resin obtained in Example 2, 35.6 g. of a 48% aqueous sodium hydroxide solution was added in drops at 113° to 117° C. as in Example 6 to effect the epoxidation reaction, which gave 116 g. of an epoxy resin with an epoxy equivalent of 335 and a softening point of 104° C. The gel permeation chromatogram of the epoxy resin is shown in FIG. 8.

The epoxy resin was cured as in Example 7 and tested for the properties. The results are shown in Table 2.

SUPPLEMENTARY EXAMPLE 3

Figure 9:
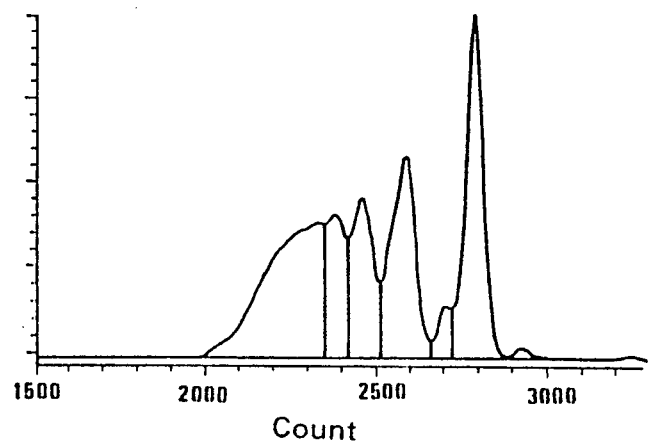
FIGS. 9 and 10 are respectively the gel permeation chromatogram and infrared absorption spectrum of the epoxy resin obtained in Example 9.
Figure 10:
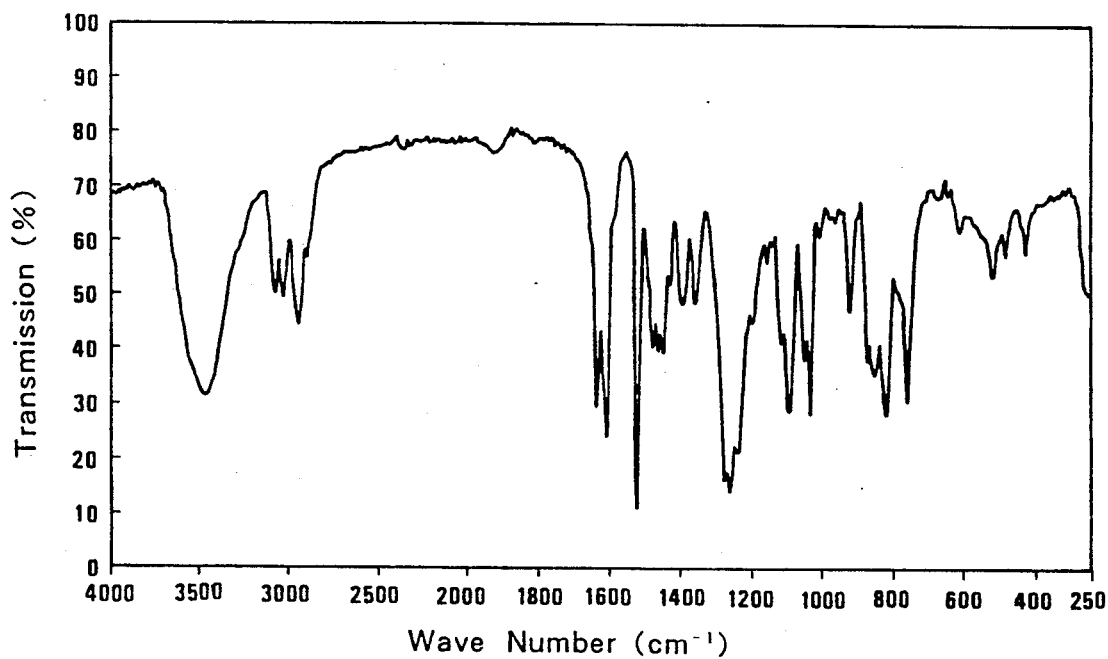

In 600 g. of epichlorohydrin was dissolved 100 g. of the naphthol aralkyl resin obtained in Example 5, 36.2 g. of a 48% aqueous sodium hydroxide solution was added in drops at 70° C. as in Example 7 to effect the epoxidation reaction, which gave 119 g. of an epoxy resin with an epoxy equivalent of 333 and a softening point of 100.5° C. The gas permeation chromatogram and infrared absorption spectrum of the epoxy resin are shown respectively in FIGS. 9 and 10.

The epoxy resin was cured as in Example 7 and tested for the properties. The results are shown in Table 2.

SUPPLEMENTARY EXAMPLE 4

In 740 g. of epichlorohydrin was dissolved 90 g. of 1,4-di[2-(1-hydroxy-2-naphthyl)-2-propoyl]benzene and 33.6 g. of a 48 wt. % aqueous sodium hydroxide solution was added in 3.5 hours at 115° C. In the meantime, water was removed from the system by azeotropic distillation with epichlorohydrin and the distilled epichlorohydrin was returned to the system. The reaction was allowed to proceed for additional 15 minutes after the addition of the aqueous sodium hydroxide solution.

Figure 11:
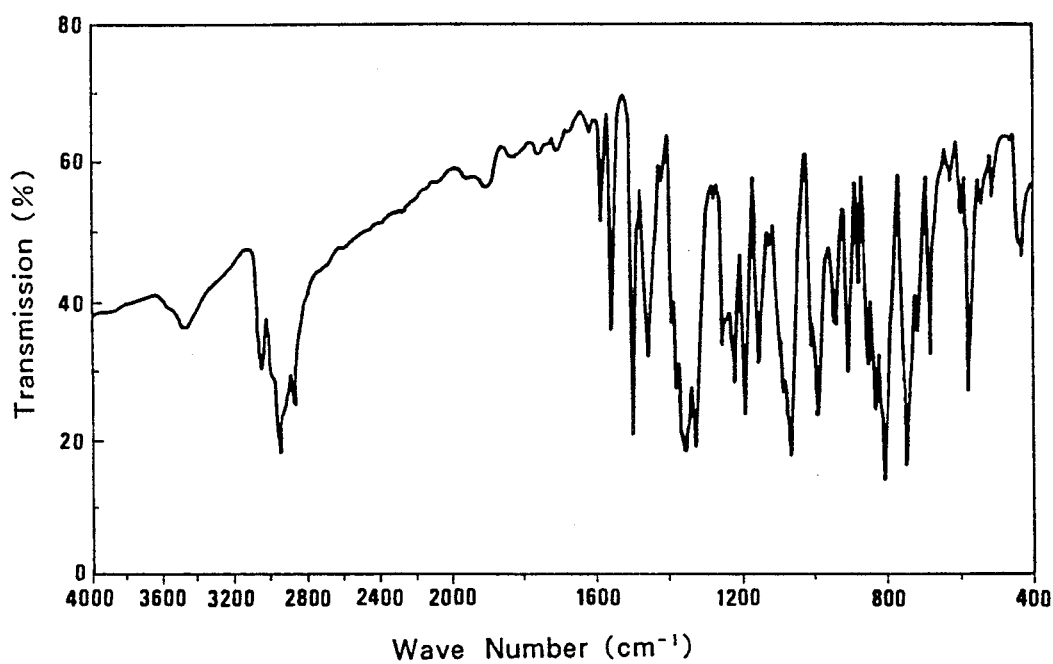
FIG. 11 is the infrared absorption spectrum of the epoxy resin obtained in Example 10.

Upon completion of the reaction, the epichlorohydrin was distilled off under reduced pressure and the residue was extracted with methyl isobutyl ketone to give 106 g. of an epoxy resin with an epoxy equivalent of 324 and a softening point of 114° C. The infrared absorption spectrum of the epoxy resin is shown in FIG. 11.

EXAMPLE 7

An epoxy resin composition was formulated from the naphthol aralkyl resin obtained in Example 5 as curing agent, an o-cresol novolak epoxy resin, and triphenylphosphine (curing agent) at the ratio shown in Table 2, cured as in Example 7, and tested for the properties. The results are shown in Table 2.

COMPARATIVE EXAMPLES 1-2

The test specimens were prepared as in Example 7 from a liquid bisphenol A-based epoxy resin (Comparative Example 1) or an o-cresol novolak epoxy resin (Comparative Example 2) and tested for the properties. The results are shown in Table 2.

TABLE 2

|  | Supplementary Example | | | Example | Comparative Example | |
|---|---|---|---|---|---|---|
|  | 1 | 2 | 3 | 7 | 1 | 2 |
| Recipe (Parts by weight) | | | | | | |
| Epoxy resin | 100 | 100 | 100 | 100 | 100 | 100 |
| Curing agent | 33 | 31 | 31 | 114 | 56 | 53 |
| Curing accelerator | 2 | 2 | 2 | 3 | 2 | 2 |
| Properties | | | | | | |
| Glass transition temperature (°C.) | 160 | 164 | 157 | 161 | 130 | 165 |
| Linear expansion coefficient ($\times 10^{-5} \cdot °C.^{-1}$) | | | | | | |
| <Tg | 5.3 | 5.4 | 5.4 | 5.7 | 6.0 | 6.3 |
| >Tg | 17.2 | 17.1 | 16.3 | 16.7 | 17.5 | 16.4 |
| Flexural strength (kg/mm$^2$) | 8.0 | 9.0 | 9.5 | 8.5 | 8.0 | 10.0 |
| Flexural modulus (kg/mm$^2$) | 350 | 345 | 320 | 325 | 280 | 320 |
| Moisture absorption (wt %) | 1.4 | 1.4 | 1.4 | 1.5 | 2.3 | 2.0 |
| Fracture toughness | 0.80 | 0.83 | 0.86 | 0.78 | 0.79 | 0.64 |

TABLE 2-continued

|  | Supplementary Example | | | Example | Comparative Example | |
|---|---|---|---|---|---|---|
|  | 1 | 2 | 3 | 7 | 1 | 2 |
| (MPa.m½) | | | | | | |

EXAMPLE 8

In a 300-ml. four-necked flask were placed 144 g (1.0 mole) of 2-naphthol, 62.1 g (0.45 mole) of p-xylylene glycol and 14 g of oxalic acid, and the mixture was allowed to react under nitrogen flow with stirring at 150° C. for 3 hours while water formed by reaction was removed from a reaction system. Thereafter, the reaction mixture was steam-distilled to remove the unchanged 2-naphthol and gave 151 g of brownous resins.

The resins thus obtained showed a hydroxyl equivalent of 216 and a softening point of 121° C. As a result of analysis by a liquid chromatography, the remaining amount of 2-naphthol is 0.1 wt %.

EXAMPLE 9

In a 300-ml. four-necked flask were placed 144 g (1.0 mole) of 2-naphthol, 55.2 g (0.4 mole) of p-xylylene glycol and 14 g of oxalic acid, and the mixture was allowed to react under nitrogen flow with stirring at 150° C. for 3 hours while water formed by reaction was removed from a reaction system. Thereafter, the reaction mixture was allowed to increase temperature at 180° C. and then heated for 2 hours with stirring to decompose the oxalic acid. The reaction mixture was then cooled until 140° C. and was allowed to react for 1 hour after adding 6.3 g of 92%-paraformaldehyde, and the reaction mixture was then allowed to remove volatile components from the reaction system under decompression and gave 185 g of brownous resins.

The resins thus obtained showed a hydroxyl equivalent of 194 and a softening point of 108° C. As a result of analysis by a liquid chromatography, the remaining amount of 2-naphthol is 0.5 wt %.

EXAMPLE 10

With the exception of using 1-naphthol in place of 2-naphthol, the reaction was carried out as in Example 8 to give brownous resins having a hydroxyl equivalent of 208 and a softening point of 89° C.

EXAMPLE 11

With the exception of using 1-naphthol in place of 2-naphthol, the reaction was carried out as in Example 9 to give brownous resins having a hydroxyl equivalent of 106 and a softening point of 108° C.

EXAMPLE 12

The resin composition for protection of IC was prepared by mixing and kneading o-cresol novolak epoxy resin as an epoxy resin and the resin obtained in Example 8 as a naphthol aralkyl resin at ratios shown in Table 3.

The resin composition thus obtained was molded at 175° C., and then specimens were prepared by postcuring at 175° C. for 12 hours and were tested for a variety of properties. The results are shown in Table 3.

In the meantime, with the use of the resin composition obtained above, the 64 pins-IC was molded, and then specimens were postcured, allowed to absorb moisture on conditions of 85° C. and 85% RH for 24 hours or 48 hours and then immersed into a solder bath at 260° C. for 10 seconds, and the situation of occurrence of cracks in package was observed and the incidence thereof was determined. The results are shown in Table 3.

EXAMPLE 13

With the exception of using the resins obtained in Example 9 as a naphthol aralkyl resin, the resin composition for protection of IC was obtained and tested for a variety of properties and the incidence of cracks, as in Example 12. The results are shown in Table 3.

COMPARATIVE EXAMPLE 3

With the exception of using phenol novolak resin in place of a naphthol aralkyl resin, the resin composition for protection of IC was obtained and tested for a variety of properties and the incidence of cracks, as in Example 12. The results are shown in Table 3.

TABLE 3

|  | Example 12 | Example 13 | Comparative Example 3 |
|---|---|---|---|
| Recipe (Parts by weight) | | | |
| Epoxy resin | 71 | 75 | 98 |
| Curing agent | 79 | 75 | 52 |
| Fused silica | 450 | 450 | 450 |
| Silane coupling agent | 2 | 2 | 2 |
| Triphenylphosphine | 1 | 1 | 1 |
| Carbon black | 2 | 2 | 2 |
| Carnauba wax | 2 | 2 | 2 |
| Properties | | | |
| Glass transition temperature (°C.) | 168 | 162 | 170 |
| Flexural strength (kg/mm²) | 14 | 13 | 13 |
| Flexural modulus (kg/mm²) | 1730 | 1720 | 1710 |
| Water absorption (wt %) | 0.48 | 0.50 | 0.68 |
| Incidence of cracks | | | |
| 24 hrs | 0/10 | 0/10 | 10/10 |
| 48 hrs | 0/10 | 0/10 | 10/10 |

EXAMPLE 14

The resin composition for protection of IC was prepared by mixing and kneading biphenyl epoxy resin as an epoxy resin and the resin obtained in Example 8 as a naphthol aralkyl resin at ratios shown in Table 4.

The resin composition thus obtained was molded at 175° C., and then specimens were prepared by postcuring at 175° C. for 12 hours and were tested for a variety of properties. The results are shown in Table 4.

In the meantime, with the use of the resin composition obtained above, the 84 pins-IC was molded, and then specimens were postcured, allowed to absorb moisture on conditions of 85° C. and 85% RH for 24 hours, 48 hours or 72 hours and then immersed into a solder bath at 260° C. for 10 seconds, and the situation of occurrence of cracks in package was observed and the incidence thereof was determined. The results are shown in Table 4.

EXAMPLE 15

With the exception of using the resins obtained in Example 10 as a naphthol aralkyl resin, the resin composition for protection of IC was obtained and tested for a variety of properties and the incidence of cracks, as in Example 14. The results are shown in Table 4.

EXAMPLE 16

With the exception of using the resins obtained in Example 12 as a naphthol aralkyl resin, the resin composition for protection of IC was obtained and tested for a variety of properties and the incidence of cracks, as in Example 14. The results are shown in Table 4.

TABLE 4

|  | Example 14 | Example 15 | Example 16 |
|---|---|---|---|
| Recipe (Parts by weight) | | | |
| Epoxy resin | 67 | 69 | 91 |
| Curing agent | 83 | 81 | 59 |
| Fused silica | 500 | 500 | 500 |
| Crushed silica | 200 | 200 | 200 |
| Silane coupling agent | 4 | 4 | 4 |
| Triphenylphosphine | 1 | 1 | 1 |
| Carbon black | 3 | 3 | 3 |
| OP wax | 3 | 3 | 3 |
| Properties | | | |
| Spiral flow (cm) | 92 | 110 | 71 |
| Flexural strength (kg/mm$^2$) | 15 | 15 | 15 |
| Flexural modulus (kg/mm$^2$) | 2000 | 2080 | 2130 |
| Water absorption (wt %) | | | |
| 24 hrs | 0.10 | 0.09 | 0.10 |
| 48 hrs | 0.24 | 0.23 | 0.30 |
| Incidence of cracks | | | |
| 24 hrs | 0/10 | 0/10 | 0/10 |
| 48 hrs | 0/10 | 0/10 | 0/10 |
| 72 hrs | 0/10 | 0/10 | 0/10 |

EXAMPLE 17

The resin composition for protection of IC was prepared by mixing and kneading o-cresol novolak epoxy resin as an epoxy resin and the resin obtained in Example 10 as a naphthol aralkyl resin at ratios shown in Table 5 and then tested for a variety of properties and the incidence of cracks, as in Example 14. The results are shown in Table 5.

EXAMPLE 18

With the exception of using the resins obtained in Example 12 as a naphthol aralkyl resin, the resin composition for protection of IC was obtained and tested for a variety of properties and the incidence of cracks, as in Example 17. The results are shown in Table 5.

COMPARATIVE EXAMPLE 4

With the exception of using phenol novolak resin in place of a naphthol aralkyl resin, the resin composition for protection of IC was obtained and tested for a variety of properties and the incidence of cracks, as in Example 17. The results are shown in Table 5.

COMPARATIVE EXAMPLE 5

With the exception of using o-cresol novolak epoxy resin as an epoxy resin, the resin composition for protection of IC was obtained and tested for a variety of properties and the incidence of cracks, as in Example 17. The results are shown in Table 5.

TABLE 5

|  | Example 17 | Example 18 | Comparative Example 4 | Comparative Example 5 |
|---|---|---|---|---|
| Recipe (Parts by weight) | | | | |
| Epoxy resin | 73 | 79 | 100 | 100 |
| Naphthol aralkyl resin, Phenol novolak resin or o-Cresol novolak epoxy resin | 77 | 57 | 50 | 50 |
| Fused silica | 500 | 500 | 500 | 500 |
| Crushed silica | 200 | 200 | 200 | 200 |
| Silane coupling agent | 4 | 4 | 4 | 4 |
| Triphenylphosphine | 1 | 1 | 1 | 1 |
| Carbon black | 3 | 3 | 3 | 3 |
| OP wax | 3 | 3 | 3 | 3 |
| Properties | | | | |
| Spiral flow (cm) | 76 | 65 | 140 | 74 |
| Flexural strength (kg/mm$^2$) | 15 | 15 | 14 | 13 |
| Flexural modulus (kg/mm$^2$) | 1910 | 1940 | 1880 | 1800 |
| Water absorption (wt %) | | | | |
| 24 hrs | 0.12 | 0.15 | 0.19 | 0.25 |
| 48 hrs | 0.30 | 0.34 | 0.45 | 0.42 |
| Incidence of cracks | | | | |
| 24 hrs | 0/10 | 0/10 | 0/10 | 10/10 |
| 48 hrs | 0/10 | 0/10 | 8/10 | 10/10 |
| 72 hrs | 0/10 | 0/10 | 10/10 | 10/10 |

What is claimed is:

1. A naphthol aralkyl resin of the formula

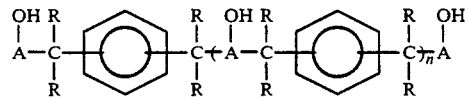

wherein A is a naphthalene nucleus, R is hydrogen or methyl, and n is an integer from 0 to 15.

2. A naphthol aralkyl resin of the formula

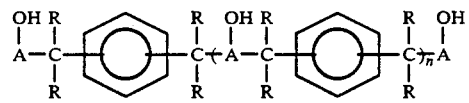

wherein A is a naphthalene nucleus, R is hydrogen or methyl, and n is an integer from 0 to 15, cured with hexamethylenetetramine, a polyisocyanate or an epoxy compound.

* * * * *